(12) United States Patent
Pakhchyan et al.

(10) Patent No.: US 7,995,261 B2
(45) Date of Patent: Aug. 9, 2011

(54) ELECTROMECHANICAL DISPLAY AND BACKLIGHT

(76) Inventors: Edward Pakhchyan, Glendale, CA (US); Haik Mesropian, Glendale, CA (US); Syuzi Pakhchyan, Glendale, CA (US)

( * ) Notice: Subject to any disclaimer, the term of this patent is extended or adjusted under 35 U.S.C. 154(b) by 0 days.

(21) Appl. No.: 12/584,465

(22) Filed: Sep. 3, 2009

(65) Prior Publication Data

US 2011/0051225 A1    Mar. 3, 2011

(51) Int. Cl.
*G02B 26/02* (2006.01)
*F21V 7/04* (2006.01)

(52) U.S. Cl. ........................................ 359/230; 362/606
(58) Field of Classification Search ................. 359/230, 359/233; 362/606, 607, 617–620
See application file for complete search history.

(56) References Cited

U.S. PATENT DOCUMENTS

| | | | |
|---|---|---|---|
| 5,521,725 A | 5/1996 | Beeson et al. | |
| 5,745,281 A | 4/1998 | Yi et al. | |
| 6,288,824 B1 | 9/2001 | Kastalsky | |
| 6,583,915 B1 | 6/2003 | Hong et al. | |
| 6,667,782 B1 * | 12/2003 | Taira et al. | 349/65 |
| 7,209,628 B2 | 4/2007 | Winston et al. | |
| 7,365,897 B2 | 4/2008 | Hagood et al. | |

* cited by examiner

*Primary Examiner* — William C Choi (57) ABSTRACT

Electromechanical light modulators and backlight providing efficient, low cost and high performance displays.

11 Claims, 7 Drawing Sheets

ELECTROMECHANICAL DISPLAY AND BACKLIGHT

RELATED U.S. PATENT DOCUMENTS

U.S. Ser. No. 12/583,156 Aug. 13, 2009 which is continuation in part of U.S. Ser. No. 12/004,115 Dec. 19, 2007 which are included here as reference.

BACKGROUND OF THE INVENTION

1. Field of the Invention

The present invention relates generally to displays. More particularly the invention concerns displays comprising an optical waveguide, a light source and a plurality of electromechanical picture elements.

2. Discussion of the Prior Art

Currently liquid crystal displays dominate the flat panel display market. Prior art liquid crystal displays typically comprise a backlight assembly for illumination, light polarizers, color and neutral density filters, and an active matrix liquid crystal layer with thin-film-transistor backplanes. The overall light efficiency of a typical prior art liquid crystal display (LCD) is below 10% mainly due to the fact that light from the backlight assembly has to pass several layers of polarizers, color and neutral density filters. A further problem with LCDs is the slow response time of the liquid crystal resulting in objectionable visible motion artifacts when displaying motion images.

Flat panel displays based on electromechanical light modulators have been proposed as a viable alternate to LCDs. One type of prior art electromechanical light modulator comprises of a light shutter plate attached to flexible members and both are constructed on a planar surface. A comb drive or similar electrostatic actuator is used to move the shutter plate in a plane parallel to the underlying substrate to modulate light.

In prior art designs the shutter plate is susceptible to tilting and touching the underlying substrate. Also electrostatic efficiency of actuators used to move the shutter plate is low. In prior art actuators, only a small surface defined by the thickness of the film is effective for generating electrostatic force. Also LCD backlights generally do not meet the requirements for illuminating electromechanical light modulators. Using a LCD backlight with electromechanical light modulators will yield similarly low light efficiency of LCDs.

SUMMARY OF THE INVENTION

It is an object of the present invention to provide a display that can compete with LCD's in light efficiency, picture quality and cost. Increased light efficiency is achieved by providing a display in which light travels most of the light path by total internal reflections and fewer reflections from highly reflective surfaces. Improved picture quality is achieved by providing fast and efficient light modulators.

Another object of the invention is to provide a high contrast display of the character that operates at high levels of ambient light. Embodiments of the invention achieve this object by providing a display wherein the majority of the viewing surface is coated with a light-absorbing coating.

The foregoing as well as other objects of the invention will be achieved by the novel display and elements illustrated in the accompanying drawings and described in the specification that follows.

DESCRIPTION OF THE INVENTION

In FIGS. 1 to 15 of the drawings like numbers are used to identify like components.

Figure 1:
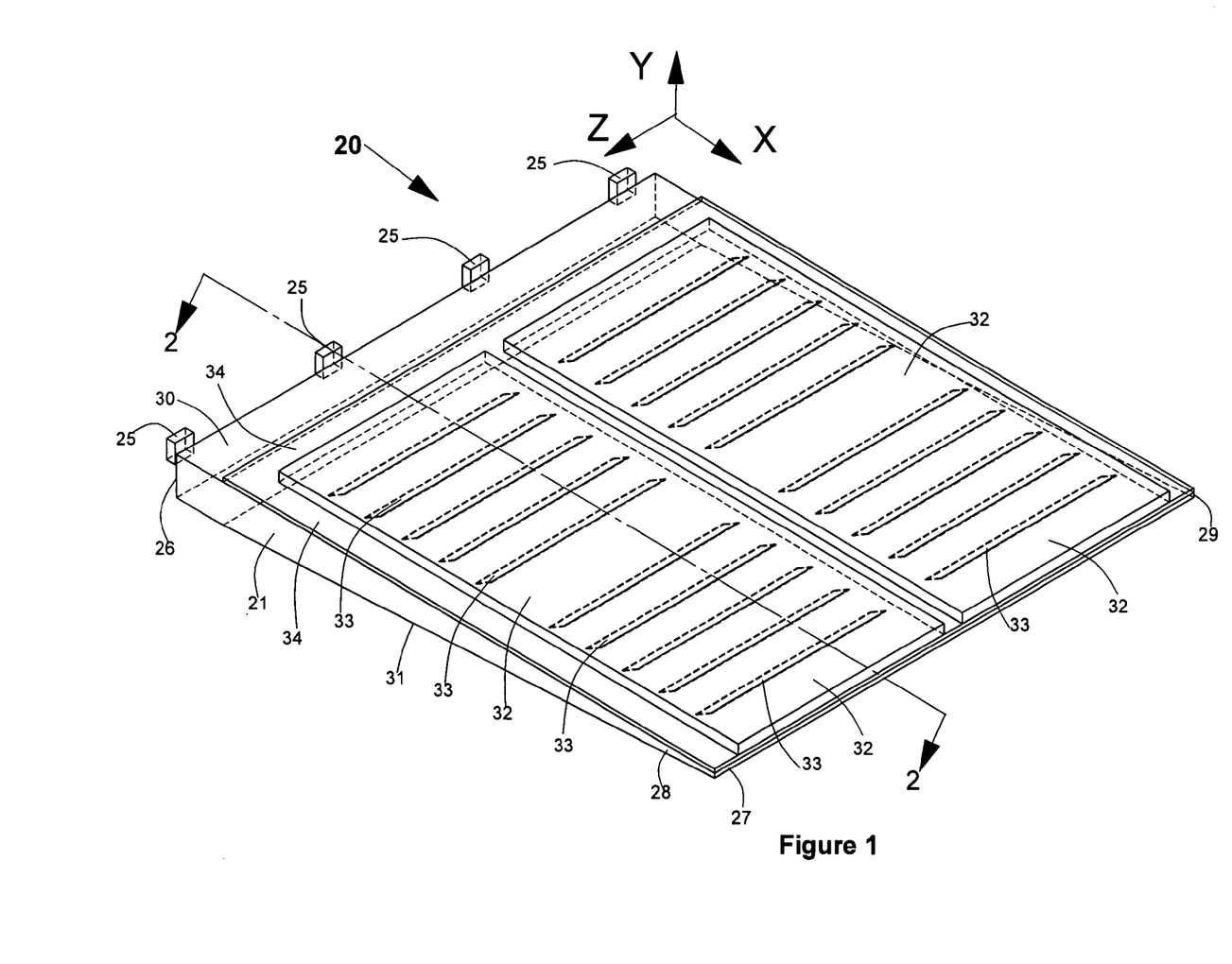
FIG. 1 is a generally perspective view of the display backlight of the present invention.
Figure 2:
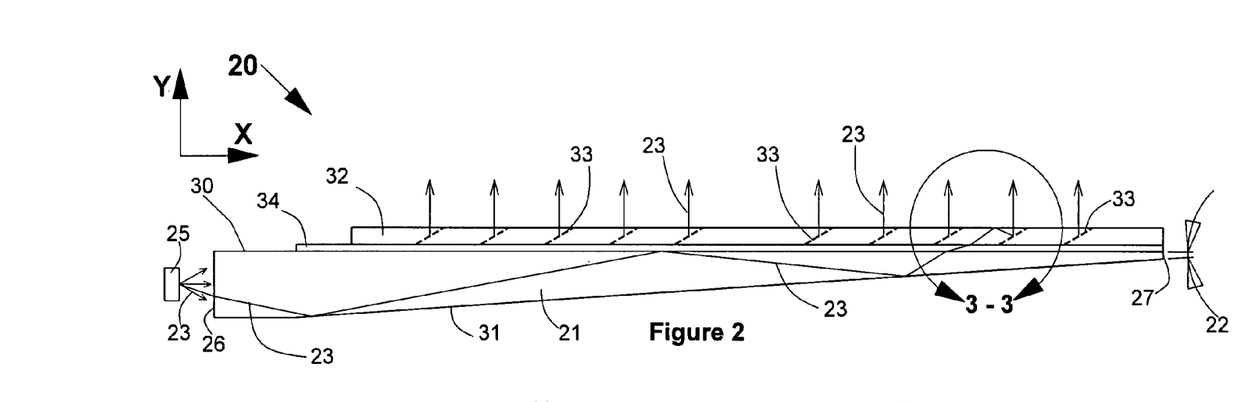
FIG. 2 is a cross-sectional view taken along lines 2-2 of FIG. 1.
Figure 3:
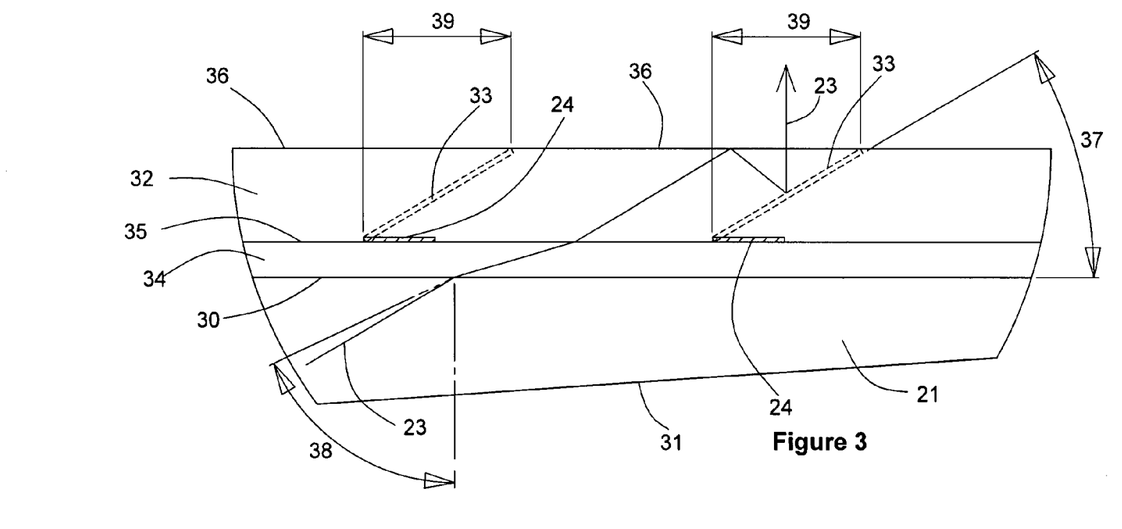
FIG. 3 is an enlarged view of the area designated as 3-3 in FIG. 2.

Referring to the drawings and particularly to FIGS. 1 to 3, one form of a display backlight of the invention is shown there and generally designated by the numeral 20. FIG. 1 is a generally perspective view of the display backlight 20. FIG. 2 is a cross-sectional view taken along lines 2-2 of FIG. 1 and FIG. 3 is an enlarged view of the area designated as 3-3 in FIG. 2.

As best seen in FIG. 1, backlight 20 here includes a generally rectangular shaped optical waveguide 21 that is substantially wedge-shaped cross section. Waveguide 21 is preferably constructed from acrylic or other optically transparent material, having a refractive index n1 with a value between 1.45 and 1.6 and comprises parallel first and second end surfaces 26 and 27 that are joined by parallel side surfaces 28 and 29 (see FIG. 1). Waveguide 21 also includes a major upper surface 30 and a lower surface 31 converging with upper surface 30. The lower surface 31 as shown in FIG. 1 is a generally flat surface and forming an angle 22 (FIG. 2) with a value between approximately 0.1 degrees to 2.0 degrees with the upper surface 30. Also the lower surface 31 may be a curved surface forming varying angles with the upper surface 30 of the waveguide 21 or include a plurality of stepwise facets for controlling the display light uniformity.

Backlight 20 further includes a first optical layer 32 constructed from a substantially transparent material having a refractive index n2 with a value between approximately 1.45 and 1.6. First optical layer 32 comprises a light exit surface 36 (FIG. 3), a light input surface 35, and a plurality of embedded light reflecting facets 33 located between light input surface 35 and light exit surface 36. As best seen in FIG. 3 embedded light reflecting facets 33 are inclined with respect to the upper surface 30 of optical waveguide 21 and form an angle 37 with a value between approximately 20 degrees and 40 degrees.

Backlight 20 also includes a second optical layer 34 formed between light input surface 35 of first optical layer 32 and upper surface 30 of waveguide 21. Second optical layer 34 is constructed from a fluoropolymer or other substantially transparent material having a refractive index n3 with a value between approximately 1.3 and 1.4.

Further illustrated in FIG. 1 are light sources 25 installed proximate the wide edge 26 of the waveguide 21.

As best seen in FIG. 2 of the drawings, light rays 23 entering from the wide edge 26 of the optical waveguide 21 reflect from the upper surface 30 and the lower surface 31 by total internal reflections and change angles towards normal with respect to the upper surface 30. Light rays 23 exit the optical waveguide 21 when the incident angle to the upper surface 30 is less than the critical angle 38 (FIG. 3) defined by the refractive index n1 of optical waveguide 21 and refractive index n3 of second optical layer 34. Light rays passing through the second optical layer 34 enter the first optical layer 32 from the light input surface 35 and change the angle defined by the refractive index n2 of first optical layer 32. As shown in FIG. 3 most light rays entering the first optical layer 32 reflect internally from the light exit surface 36. Light rays exit first optical layer 32 from the light exit regions 39 by reflecting from embedded light reflecting facets 33.

For some combinations of refractive indexes n1, n2, n3 and angle 37, light rays entering the first optical layer 32 may reflect from the light reflecting facets 33 and change the angles before reflecting internally from the light exit surface 36. To prevent this, backlight 20 further includes a light reflecting layer 24 (FIG. 3) formed between the first optical layer 32 and the second optical layer 34. Light reflecting layer 24 preferably has a specular light reflecting lower surface.

Figures 4, 5:
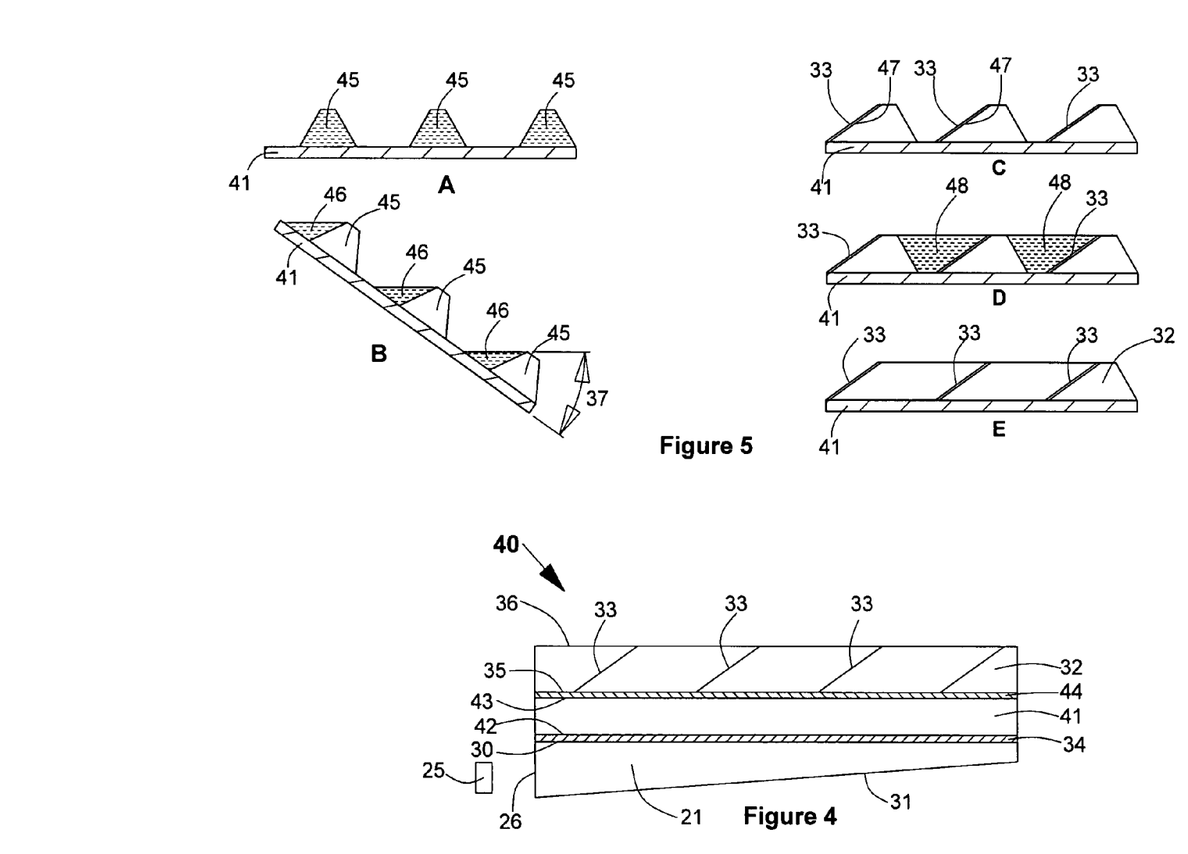
FIG. 4 is a generally cross-sectional view of an alternate form of display backlight of the invention.
FIG. 5 illustrates fabrication steps of an optical layer with embedded light reflecting facets of the invention.

Referring now to FIG. 4 of the drawings, a cross-sectional view of another embodiment of display backlight of the present invention is there shown and generally designated by the numeral 40. This latest embodiment is similar in some respect to the embodiment shown in FIGS. 1 and 2 of the drawings and like numbers are used in FIG. 4 to identify like components.

As before the display backlight 40 includes optical waveguide 21, light sources 25 installed proximate the wide edge 26 of optical waveguide 21, first optical layer 32 with embedded light reflecting facets 33 and second optical layer 34. The display backlight 40 further includes a substrate 41 constructed from a substantially transparent material such as glass having a refractive index n4 with a value between approximately 1.45 and 1.6 and a dichroic filter 44 formed on the upper surface 43 of substrate 41.

As shown in FIG. 4 the light input surface 35 of first optical layer 32 is optically coupled to the upper surface 30 of optical waveguide 21 via dichroic filter 44, substrate 41 and second optical layer 34.

The steps for fabrication of first optical layer 32 with embedded light reflecting facets 33 are illustrated in FIG. 5. In step (A) micro-prisms 45 are constructed on the substrate 41 using lithography from a UV curing liquid polymer. In step (B) the substrate 41 is tilted at about angle 37 and extensions 46 of micro-prisms 45 are formed from the same liquid polymer. In step (C) a reflective mirror film is deposited on each facet 47 of extensions 46 to form light reflecting facets 33. In step (D) grooves 48 are filled with the same UV curing liquid polymer. FIG. 5E illustrates a completed construction of first optical layer 32 with embedded light reflecting facets 33.

Figure 6:
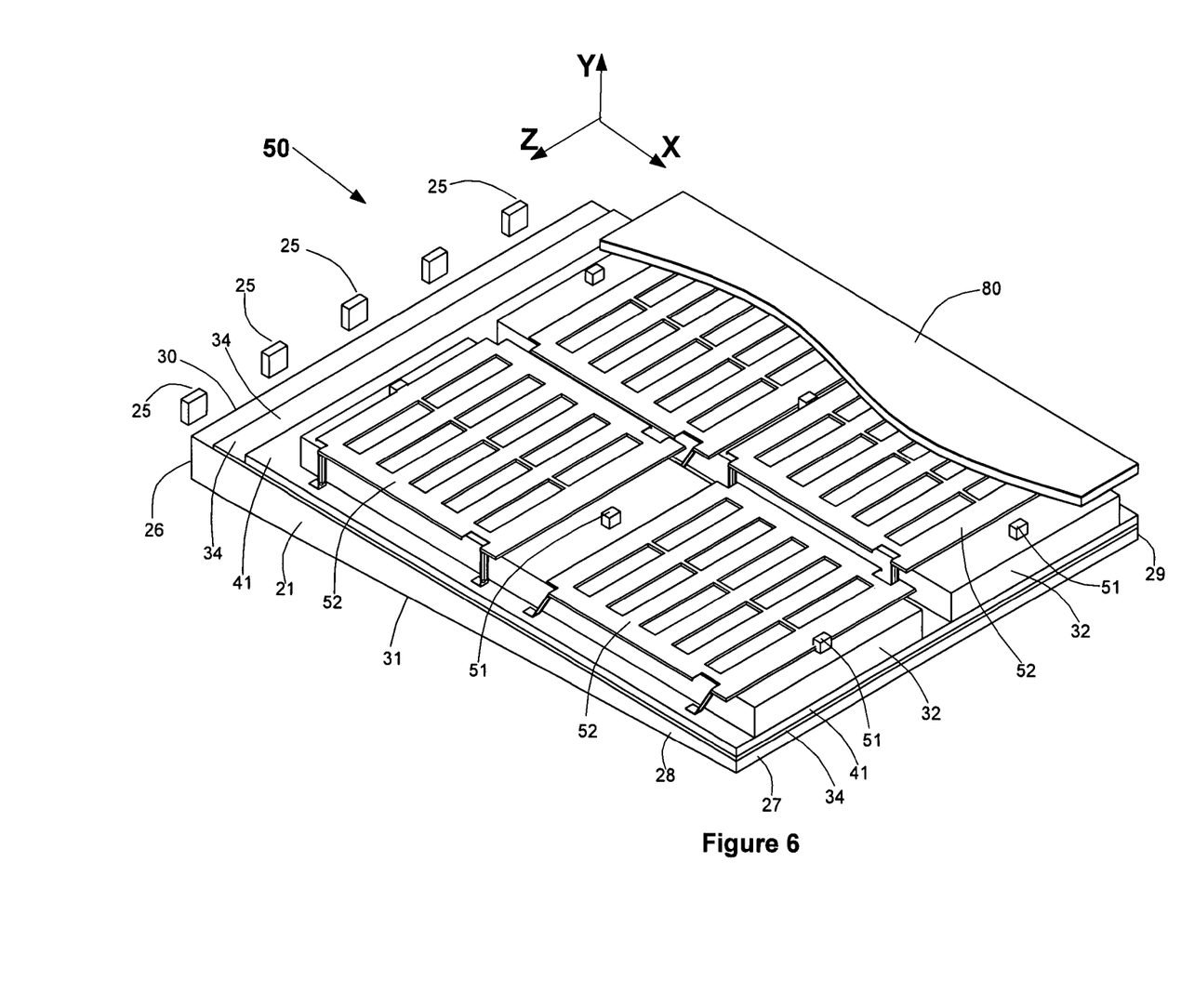
FIG. 6 is a generally perspective view of the display of the invention.
Figure 7:
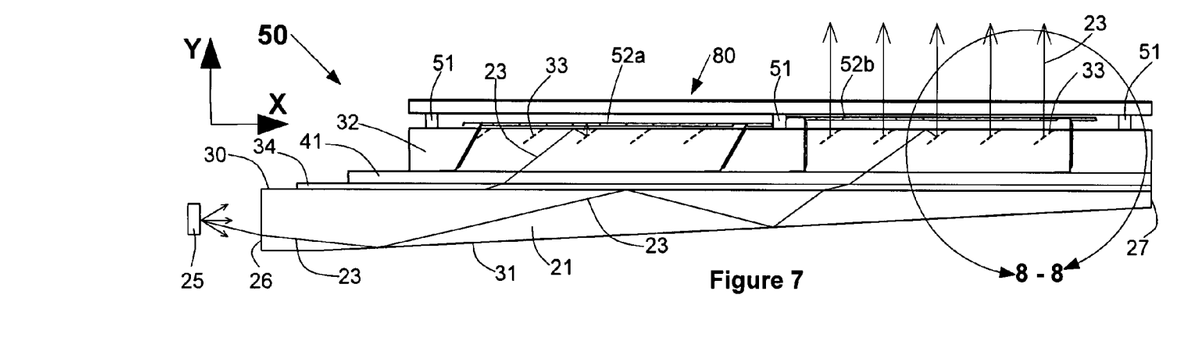
FIG. 7 is a side view of the display illustrated in FIG. 6.
Figure 8:
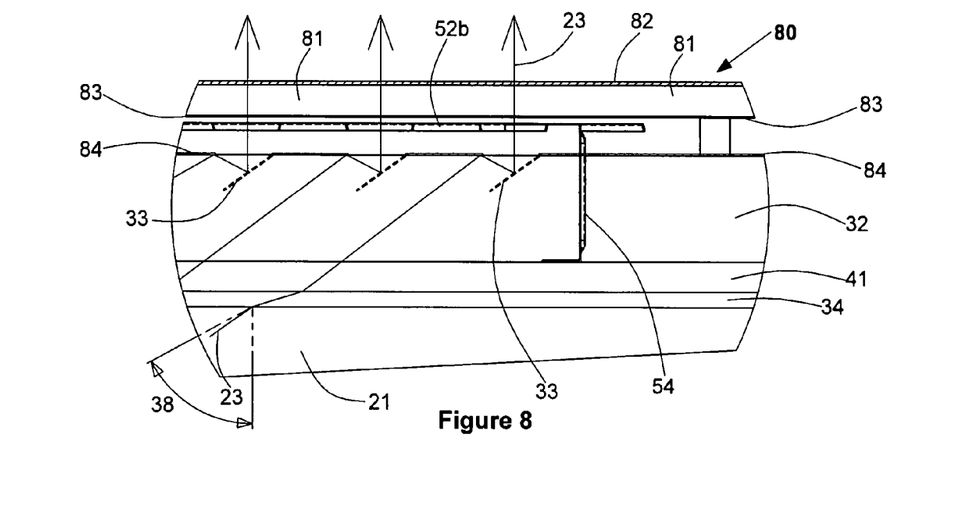
FIG. 8 is an enlarged view of the area designated as 8-8 in FIG. 7.

FIGS. 6 to 8 illustrate one form of the display of the invention and as shown there generally designated by the numeral 50. FIG. 6 is a generally perspective view and FIG. 7 is a side view of the display 50. FIG. 8 is an enlarged view of the area designated as 8-8 in FIG. 7.

Display 50 includes optical waveguide 21, light sources 25, substrate 41, first optical layer 32 with embedded light reflecting facets 33 and second optical layer 34 that were described before with respect to FIGS. 1 to 4 of the drawings.

Display 50 also includes a plurality of spacers 51 constructed on upper surface 36 of first optical layer 32 and a cover assembly 80 which is affixed on spacers 51. Cover assembly 80 (FIG. 8) includes a substrate 81 made of glass or other substantially transparent material and a light shaping diffuser layer 82 formed on the upper surface of substrate 81.

Display 50 further includes a plurality of novel light shutters 52. More details of light shutters 52 of the invention are illustrated in FIGS. 9 to 12 of the drawings and will be described shortly. Display 50 also includes a first electrode 83 (FIG. 8) formed on the lower surface of substrate 81 and a second electrode 84 formed on upper surface 36 of first optical layer 32. Both electrodes may be constructed from a transparent conductor such as ITO. The second electrode 84 is preferably constructed from a metal film having a specular light reflecting lower surface and a light absorbing upper surface and is patterned to allow light to pass from the light exit regions 39 (FIG. 3).

Figure 9:
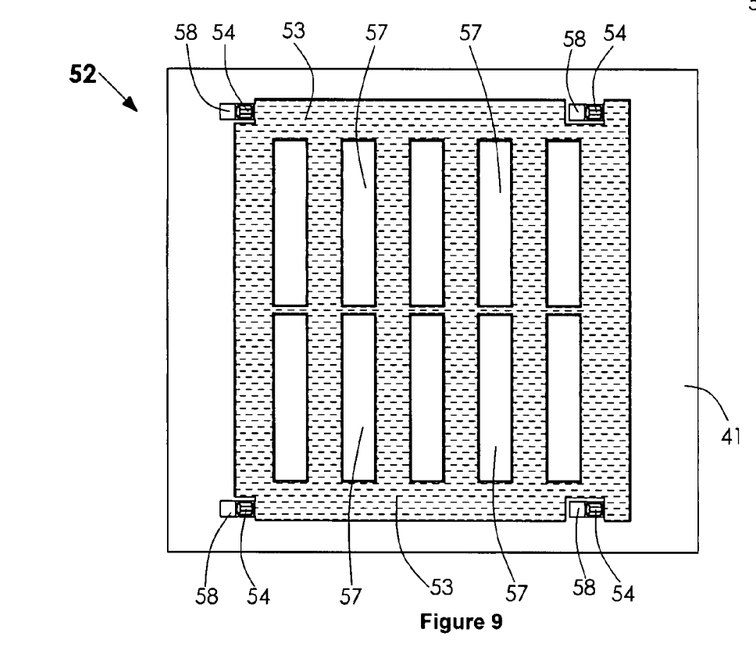
FIG. 9 illustrates a generally top view of the light shutter of the invention.
Figure 10:
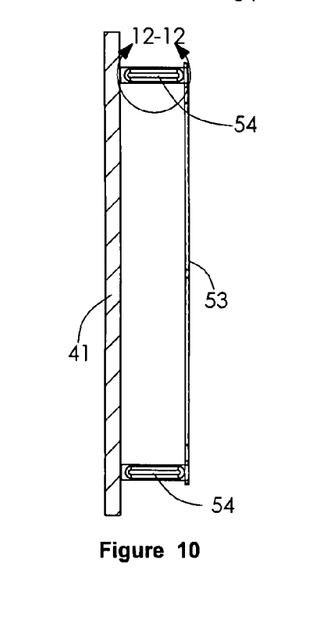
FIG. 10 illustrates a front view of the light shutter of the invention.
Figure 11:
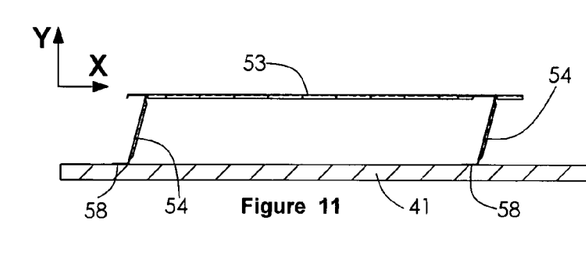
FIG. 11 illustrates a side view of the light shutter of the invention.
Figure 12:
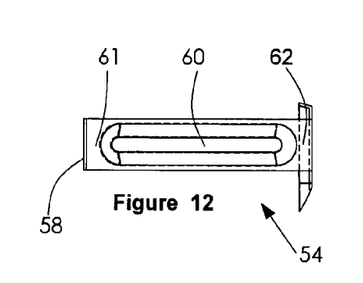
FIG. 12 is an enlarged view of the area designated as 12-12 in FIG. 10.

Referring now to FIGS. 9 to 12 of the drawings, where FIG. 9 illustrates a generally top view of light shutter 52, FIG. 10 illustrates the front view and FIG. 11 illustrates the side view of light shutter 52. FIG. 12 is an enlarged view of the area designated as 12-12 in FIG. 10.

Light shutter 52 comprises a shutter plate 53 suspended above substrate 41 with four tilting supports 54. Shutter plate 53 is constructed from an opaque thin metal film or a multi-layer film having a conductor layer and includes a plurality of light transmitting regions 57. Shutter plate 53 and tilting supports 54 are preferably constructed from a thin aluminum alloy film with a black oxide finish. Pads 58 are used to attach tilting supports 54 to substrate 41.

All edges of shutter plate 53 are beveled to prevent shutter plate 53 from bowing or bending. Each tilting support 54 is constructed with a rigid middle part 60 (FIG. 12) across most of the length of support 54 and flat flexible ends 61 and 62. Therefore supports 54 tilt by bending only at flat ends 61 and 62 in opposite directions.

In operation, shutter plate 53 moves with respect to the substrate 41 and optical layer 32 (FIG. 7) to block or allow light to pass through light transmitting regions 57.

When a suitable voltage is applied between the first electrode 83 and shutter plate 53, generated electrostatic attraction force moves shutter plate 53 to the upper left position and tilts supports 54 to near the upright position. This is illustrated in FIG. 7 at light shutter 52b where as shown light rays 23 pass through light transmitting regions 57. When a suitable voltage is applied between the second electrode 84 and shutter plate 53, generated electrostatic attraction force moves shutter plate 53 to the lower right position and tilts supports 54 to a tilted position. This is illustrated in FIG. 7 at light shutter 52a where as shown light rays 23 are blocked. Spacers 51 act as a mechanical stop and limit the lower right position of shutter plate 53 and tilt angle of supports 54.

Figure 13:
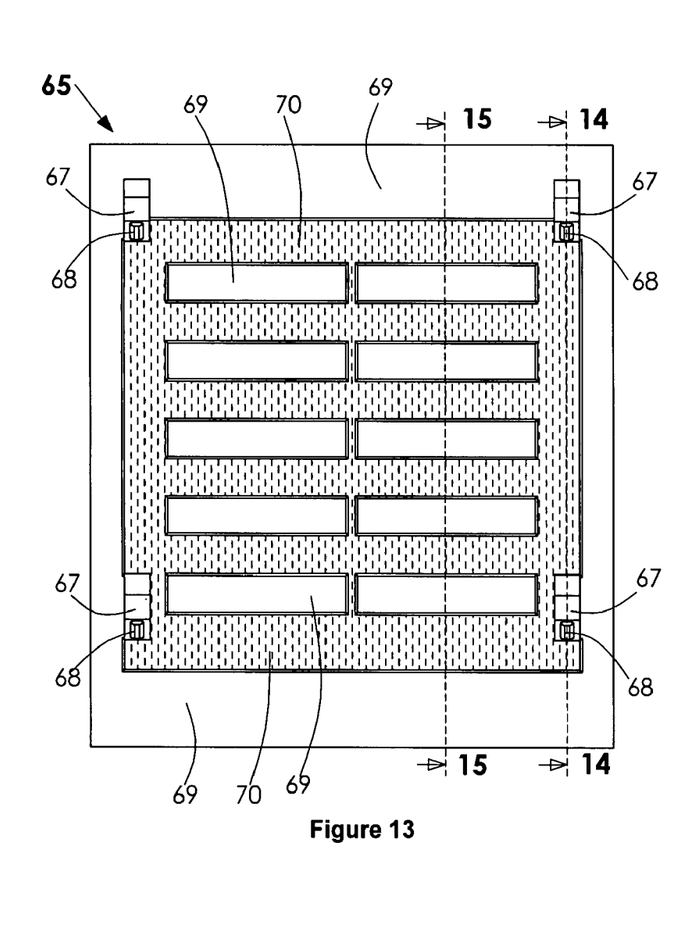
FIGS. 13 to 15 illustrate a mold for aiding the fabrication of light shutters.
Figures 14, 15:
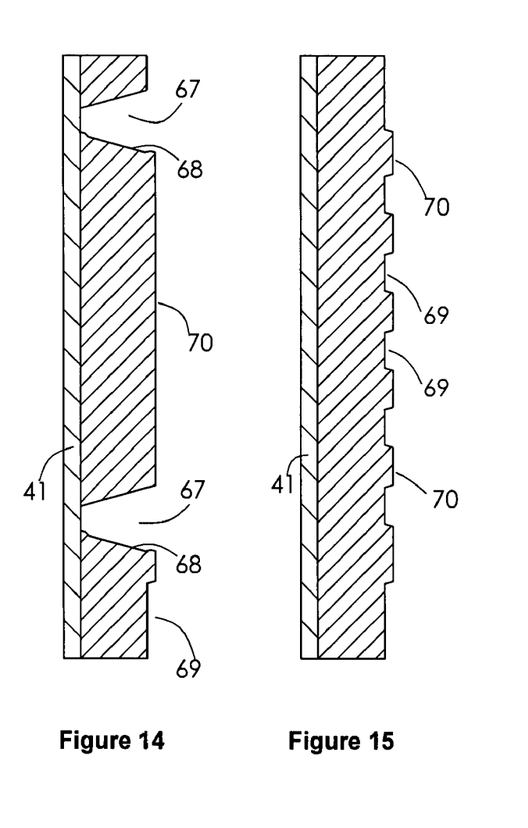

FIGS. 13 to 15 illustrate a mold for aiding the fabrication of light shutter 52 and, as shown there, generally designated by the numeral 65. FIG. 13 illustrates a top view of the mold 65, FIG. 14 is the cross-sectional view taken along lines 14-14 and FIG. 15 is the cross-sectional view taken along lines 15-15 of FIG. 13.

The mold 65 is constructed from a photo-resist layer applied on substrate 41 using gray-scale lithography or multiple masks. Pits 67 and recessed regions 69 are formed on the surface 70 and a groove 68 is formed on a inclined wall of each pit 67. As shown in the drawing the outer surface of the mold 65 generally has the same shape of shutter 52. Shutter 52 is constructed by depositing and selectively etching a thin layer of conductive film on surfaces of the mold 65.

Light transmitting regions 57 of shutter plate 53 are formed in recessed regions 69 and supports 54 are formed in pits 67. The rigid middle part 60 of the supports 54 are formed in grooves 68.

Having now described the invention in detail in accordance with the requirements of the patent statutes, those skilled in this art will have no difficulty in making changes and modifications in the individual parts or their relative assembly or fabrication methods in order to meet specific requirements or conditions. Such changes and modification may be made without departing from the scope and spirit of the invention, as set forth in the following claims.

We claim:

1. A backlight for a display comprising:
   (a) a light source for generating light,
   (b) an optical waveguide for receiving and distributing said light, comprising: a refractive index n1, an upper surface, and a lower surface converging with said upper surface, and
   (c) a first optical layer having a refractive index n2, a plurality of embedded light reflecting facets, a light exit surface, and a light input surface optically coupled to said upper surface of said optical. waveguide via a second optical layer having a refractive index n3 which is less than said refractive index n1 and said refractive index n2 and greater than 1,
   wherein most light rays entering from said light input surface of said first optical layer reflect light exit surface and light rays exit said first optical layer from said light exit surface by reflecting from said embedded light reflecting facets.

2. The backlight of claim 1 in which said refractive index n1 is between approximately 1.45 and 1.6, said refractive index n2 is between approximately 1.45 and 1.6, and said refractive index n3 is between approximately 1.3 and 1.4 and each said embedded light reflecting facet of said first optical layer is inclined with respect to said upper surface of said optical waveguide and forms an angle between approximately 20 degrees and 40 degrees.

3. The backlight of claim 1 in which said light input surface of said first optical layer is optically coupled to said upper surface of said optical waveguide via a dichroic filter.

4. The backlight of claim 1 in which said first optical layer is constructed with a fabrication steps of:
   (a) constructing a plurality of spaced apart microprisms from a liquid polymer on a surface,
   (b) tilting said surface at a predetermined angle and constructing an extension to each said microprism from said liquid polymer,
   (c) depositing a specular reflective film on each said extension of said microprism,
   (d) filling between said spaced apart microprisms with said liquid polymer.

5. The backlight of claim 1 in which said second optical layer is constructed from a fluoropolymer.

6. The backlight of claim 1 further includes a light reflecting layer located between said first and second optical layers for blocking light at predetermined regions.

7. An electromechanical display element for modulating light comprising:
   (a) an optical waveguide having a refractive index nl, an upper surface and a spaced apart lower surface converging with said upper surface,
   (b) a first optical layer having a refractive index n2, a light exit surface, a light input surface, a plurality of embedded light reflecting facets located between said light input surface and said light exit surface, and
   (c) a light shutter disposed proximate said light exit surface of said first optical layer,
   wherein said light input surface of said first optical layer is optically coupled to said upper surface of said optical waveguide via a second optical layer having a refractive index n3, which is less than said refractive index n1 and said refractive index n2 and greater than 1.

8. The display element of claim 7 further includes a cover assembly comprising: a substantially transparent substrate, a light shaping diffuser layer and an electrode.

9. The display element of claim 7 in which said refractive index n1 is between approximately 1.45 and 1.6, said refractive index n2 is between approximately 1.45 and 1.6, and said refractive index n3 is between approximately 1.3 and 1.4, and each said embedded light reflecting facet of said first optical layer is inclined with respect to said upper surface of said optical waveguide and forms an angle between approximately 20 degrees and 40 degrees.

10. The display clement of claim 7 in which said light input surface of said first optical layer is optically coupled to said upper surface of said optical waveguide via a dichroic filter.

11. The display element of claim 7 in which said light shutter comprising:
    (a) a light shutter plate suspended above a surface with a. plurality of spaced apart supports positioned to tilt in the same direction with respect to said surface,
    (b) means for moving said light shutter plate and tilting said supports with respect to said surface from near the upright position to a tilted position, and
    (c) a stop for limiting the tilt angle of said supports at said tilted position.

\* \* \* \* \*

UNITED STATES PATENT AND TRADEMARK OFFICE
CERTIFICATE OF CORRECTION

| | | |
|---|---|---|
| PATENT NO. | : 7,995,261 B2 | Page 1 of 1 |
| APPLICATION NO. | : 12/584465 | |
| DATED | : August 9, 2011 | |
| INVENTOR(S) | : Pakhchyan et al. | |

It is certified that error appears in the above-identified patent and that said Letters Patent is hereby corrected as shown below:

In the Claims

In claim 1, column 5, line 29, "reflect light exit surface" should read

-- reflect internally from said light exit surface --.

Signed and Sealed this
Fifth Day of May, 2015

Michelle K. Lee
*Director of the United States Patent and Trademark Office*